(No Model.)
J. FRETWELL.
PHOTOGRAPHIC CAMERA.
No. 511,133. Patented Dec. 19, 1893.
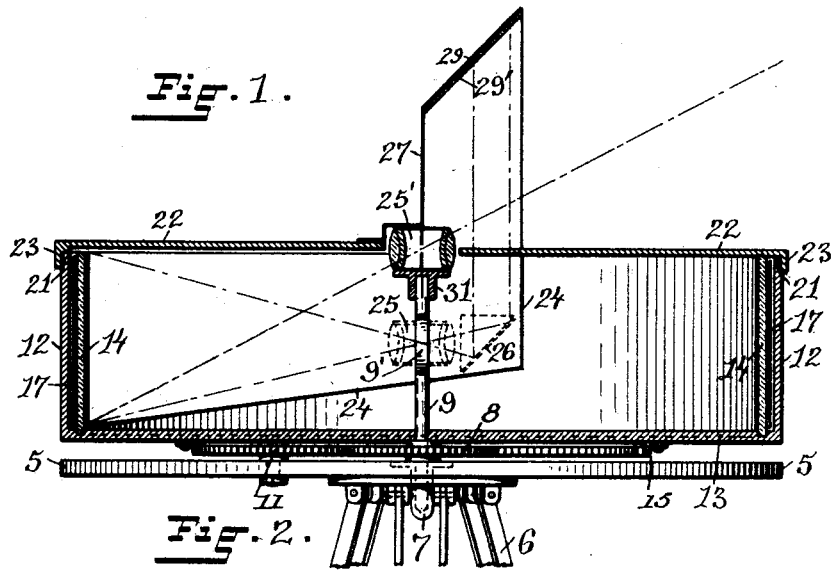
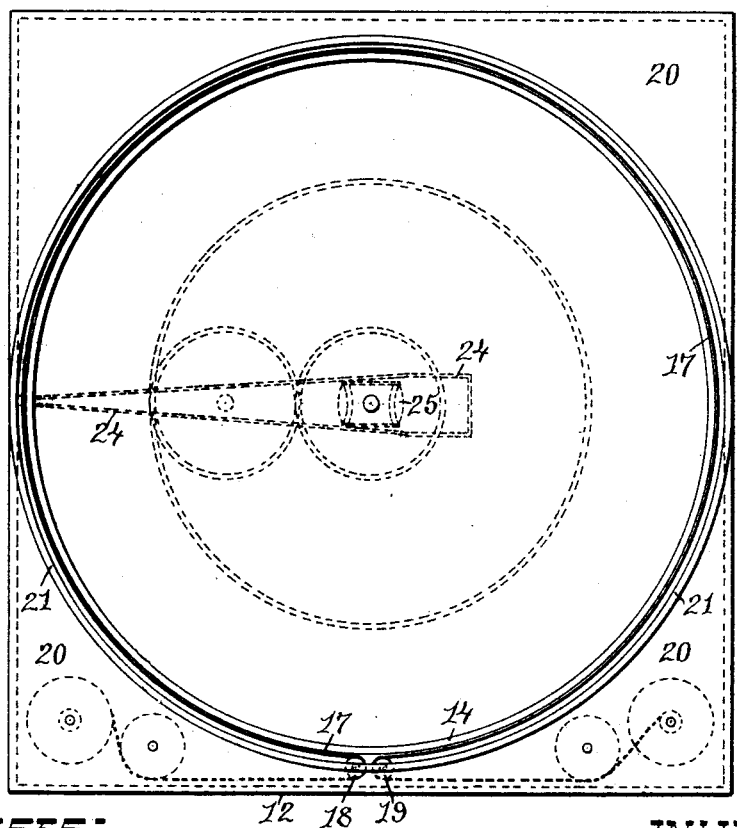
WITNESSES:
Henry J. Miller
Chas. H. Luther Jr.
INVENTOR:
John Fretwell,
by Joseph A. Miller & Co.,
Atty's.

UNITED STATES PATENT OFFICE.

JOHN FRETWELL, OF PROVIDENCE, RHODE ISLAND.

PHOTOGRAPHIC CAMERA.

SPECIFICATION forming part of Letters Patent No. 511,133, dated December 19, 1893.

Application filed October 24, 1892. Serial No. 449,881. (No model.)

*To all whom it may concern:*

Be it known that I, JOHN FRETWELL, of the city of Providence, in the county of Providence and State of Rhode Island, have invented certain new and useful Improvements in Photographic Cameras; and I hereby declare that the following is a full, clear, and exact description of the same, reference being had to the accompanying drawings, forming part of this specification.

This invention has reference to improvements in what are known in the arts as panoramic-cameras.

The object of this invention is to produce a simple and durable panoramic-camera.

The further object of the invention is to produce a panoramic-camera by which practically the whole horizon may be photographed.

The invention consists of the novel construction of the camera and the peculiar combination therewith of lenses.

The invention also consists in the combination with a camera of the novel cylinder for supporting the sensitive-film.

The invention further consists in certain other novel features of construction and novel combination of parts which will hereinafter be more fully described and pointed out in the claims.

Figure 1 represents a cross-sectional view of one form of the improved camera showing different positions of a lens the focal length of which is equal to the radius of the circle on which the sensitive film is supported; a system of gearing is also indicated which may be used in combination with a lens of longer focus. Fig. 2 represents a top view of the improved camera with the top removed.

Similar numbers of reference designate corresponding parts throughout.

In the drawings 5 indicates a table which is supported for field use by a tripod 6 but which may be supported in any ordinary manner. In the axial center of the table is secured a vertical socket-bearing 7 and above this bearing is a central gear 8 secured to the shaft 9 the lower end of which is journaled in the bearing 7. Secured to the table 5 is a shaft on which a removable-gear 11 is journaled, this gear intermeshing with an annular-rack 15 secured to the bottom 13 of the camera case.

The camera-case 12 may be of any suitable size and shape, but is preferably square to allow for carrying the supply-roll and take-up roll for the sensitive film together with any ordinary tension-device and mechanism for indicating the length of film traversing the same in its movement; in the bottom 13 of the case is formed a circular-groove in which a glass or other suitable transparent-cylinder 14 is free to revolve, but may be fixed by a stop when desired. To the lower surface of the bottom 13 is secured the annular-rack 15 which intermeshes with the removable-gear 11. The shaft 9 extends through a central perforation in the case bottom 13 and the upper end is squared. The portion of this shaft within the camera case is branched as at 9' to allow the lens-tubes to be secured therein where the prisms are used, as indicated in dotted lines in Fig. 1.

Outside the transparent cylinder 14 is located and supported thereby the sensitive film 17. If this be of material rigid enough to keep its circular form without aid the transparent cylinder may be dispensed with, but when a flexible roller film is used the transparent cylinder will be necessary. During the exposure the film is fixed in regard to the cylindrical support, but in winding it up after exposure it is guided in its passage to and from the cylinder 14 by means of the small vertical rollers 18 and 19, and, as the cylinder is free to revolve when the film is drawn around, there will be little friction between the sensitive surface and the cylinder. The top 20 of the case has a circular opening and surrounding this is a raised flange 21. On this flange is supported a rotatable cover 22 formed of thin material so as not to obstruct the upper half of the lens. The cover has a flange 23 to make a light-tight joint and depending from the cover is a light-chamber 24 which, near the center of the cover, is of a width equal to that of the lens-case. At its outer end, near the cylinder 14, the walls of the light-chamber approach each other having a narrow vertical slit between them through which light may be admitted to the sensitive film. The light-chamber may be of any desirable form to contain the lens-tube 25 and the prism or reflector 26, as indicated in Fig. 1. The cover 22 is provided with a suitable aperture through which rays of light may be directed into the light-chamber 24, and in this aperture I secure the lens-tube 25' shown in solid lines in Fig. 1. Over the aperture in the cover 22 I sometimes place a hood 27 and in the upper portion thereof I secure a mirror 29' forming the inner surface of the top of the hood 29, for directing the light rays downward before passing through the lens 25, Fig. 1. To the lower surface of the cover 22 I secure the square socket 31 which fits on the end of the shaft 9. It is, therefore, obvious that if the camera-case carrying the cylinder 14 and the film 17 be revolved in one direction the cover 22 and the hood 27 with the lens 25 or 25' carried by the shaft 9 will be revolved in the other direction and at the same speed through the gears 11 and 8 and the rack 15, the result being that when the lens 25 or 25' has traversed one-half of the horizon the open end of the light-chamber will have admitted the rays of light entering the same to the entire length of the film. When a lens is used the focal length of which is equal to the radius of the circle in which the film 17 extends, the gear 11 is removed and the cover 22 is revolved by hand or by any other suitable power; in this case the lens is located as represented in solid lines in Fig. 1 to transmit the view of the upper half of the horizon, or by placing the lens as indicated in dotted lines in Fig. 1 and by the use of reflectors and prisms to transmit a view of the upper and lower horizon, an entire revolution of the lens will be required to traverse the open end of the light-chamber over the length of the film.

Having thus described my invention, I claim as new and desire to secure by Letters Patent—

1. In a photographic-camera, the combination with a case and a transparent cylinder supported therein, of a rotatable cover having a central opening, and a lens supported in said opening, as described.

2. In a photographic camera, the combination with a case having means for supporting a sensitive film in a circle therein, of a rotatable cover having an aperture, a lens supported by the cover, and a light-chamber constructed to direct the rays of light passing through the lens to the inner surface of the circular film, as described.

3. The combination with the case 12, the annular-rack secured to the bottom thereof, the revoluble glass cylinder 14 contained therein and adapted to support a sensitive film, and spools for containing the film before and after exposure, of the table 5, a socket 7 mounted therein, a vertical-shaft 9 journaled therein and having a central gear, an intermediate gear journaled on a shaft secured to the table and intermeshing with the central gear and the rack, the rotatable cover 22, having an aperture, mounted on the upper end of the shaft, the light-chamber 24 secured to the lower surface of the cover, the hood 27 secured to the cover, a lens carried by said cover, and means for directing the light rays passing through the lens to the vertical opening in the light-chamber, as described.

JOHN FRETWELL.

Witnesses:
HENRY J. MILLER,
M. F. BLIGH.